(12) United States Patent
Moore

(10) Patent No.: US 8,950,775 B2
(45) Date of Patent: Feb. 10, 2015

(54) RECEIVER DEVICE FOR ENGAGING A LANDING GEAR ADAPTER WITH A TUG

(76) Inventor: Michael Moore, Markham (CA)

(*) Notice: Subject to any disclaimer, the term of this patent is extended or adjusted under 35 U.S.C. 154(b) by 135 days.

(21) Appl. No.: 13/273,152

(22) Filed: Oct. 13, 2011

(65) Prior Publication Data

US 2012/0091692 A1    Apr. 19, 2012

Related U.S. Application Data

(60) Provisional application No. 61/392,541, filed on Oct. 13, 2010.

(51) Int. Cl.
*B60D 1/14* (2006.01)
*B60D 1/167* (2006.01)
*B60D 1/01* (2006.01)
*B64F 1/22* (2006.01)

(52) U.S. Cl.
CPC ........ *B60D 1/01* (2013.01); *B60D 1/167* (2013.01); *B64F 1/224* (2013.01)
USPC ........ 280/493; 280/460.1; 280/477; 280/495; 280/504

(58) Field of Classification Search
USPC ............ 280/416.1, 446.1, 456.1, 460.1, 493, 280/495, 503, 504, 477, 479.2, 479.3
See application file for complete search history.

(56) References Cited

U.S. PATENT DOCUMENTS

| | | | |
|---|---|---|---|
| 2,944,837 A * | 7/1960 | Fotheringham | 280/503 |
| 3,995,878 A * | 12/1976 | Geraci et al. | 280/488 |
| 4,418,936 A | 12/1983 | Adams et al. | |
| 4,470,564 A * | 9/1984 | Johnson | 244/50 |
| 5,078,418 A * | 1/1992 | Kalmanson | 280/506 |
| 5,129,667 A * | 7/1992 | Gratton | 280/493 |
| 5,151,003 A | 9/1992 | Zschoche | |
| 5,261,778 A | 11/1993 | Zschoche | |
| 5,302,075 A * | 4/1994 | Zschoche | 414/428 |
| 5,494,310 A * | 2/1996 | Soles | 280/450 |
| 5,967,541 A | 10/1999 | Johansen | |
| 6,543,790 B2 * | 4/2003 | Johnson | 280/3 |
| 8,562,014 B2 * | 10/2013 | Seidman et al. | 280/503 |

OTHER PUBLICATIONS

Brackett aircraft towing chart, www.brackettaircraft.com/adapterspec.sht (publication date unknown).
Priceless tugs binder (publication date unknown).
Tronair catalog excerpts, www.tronair.com (publication date unknown).

* cited by examiner

*Primary Examiner* — Joseph M Rocca
*Assistant Examiner* — Marc A Scharich
(74) *Attorney, Agent, or Firm* — Standley Law Group LLP

(57) ABSTRACT

A receiver device for engaging a landing gear adapter unit with a tug. In exemplary embodiments, the adapter may include a tow bar with a neck portion between a pair of spaced arm portions. The receiver device forms a travel path boundary for the neck portion and is configured to be complementary with and to engage the neck portion. A mounting portion is provided for mounting the receiver device on the tug in an operative configuration relative to a landing gear-receiving base thereon. At least one releasable locking member is positioned along the travel path to interrupt travel of the neck portion. The locking member is movable between a first unlocked position and a second locked position. Further, in the second locked position, the locking member is configured to lock the mounting portion in the operative configuration.

17 Claims, 7 Drawing Sheets

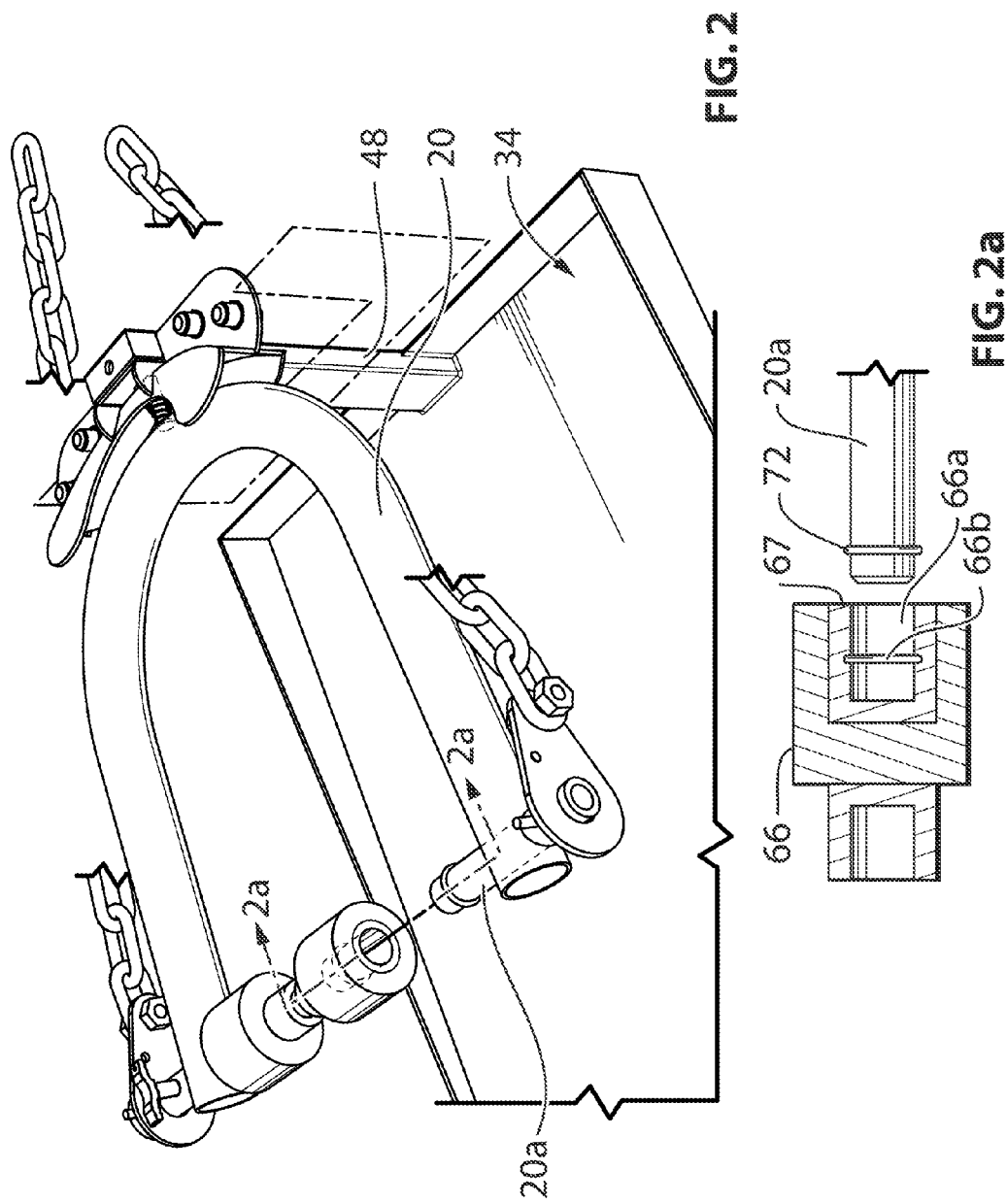

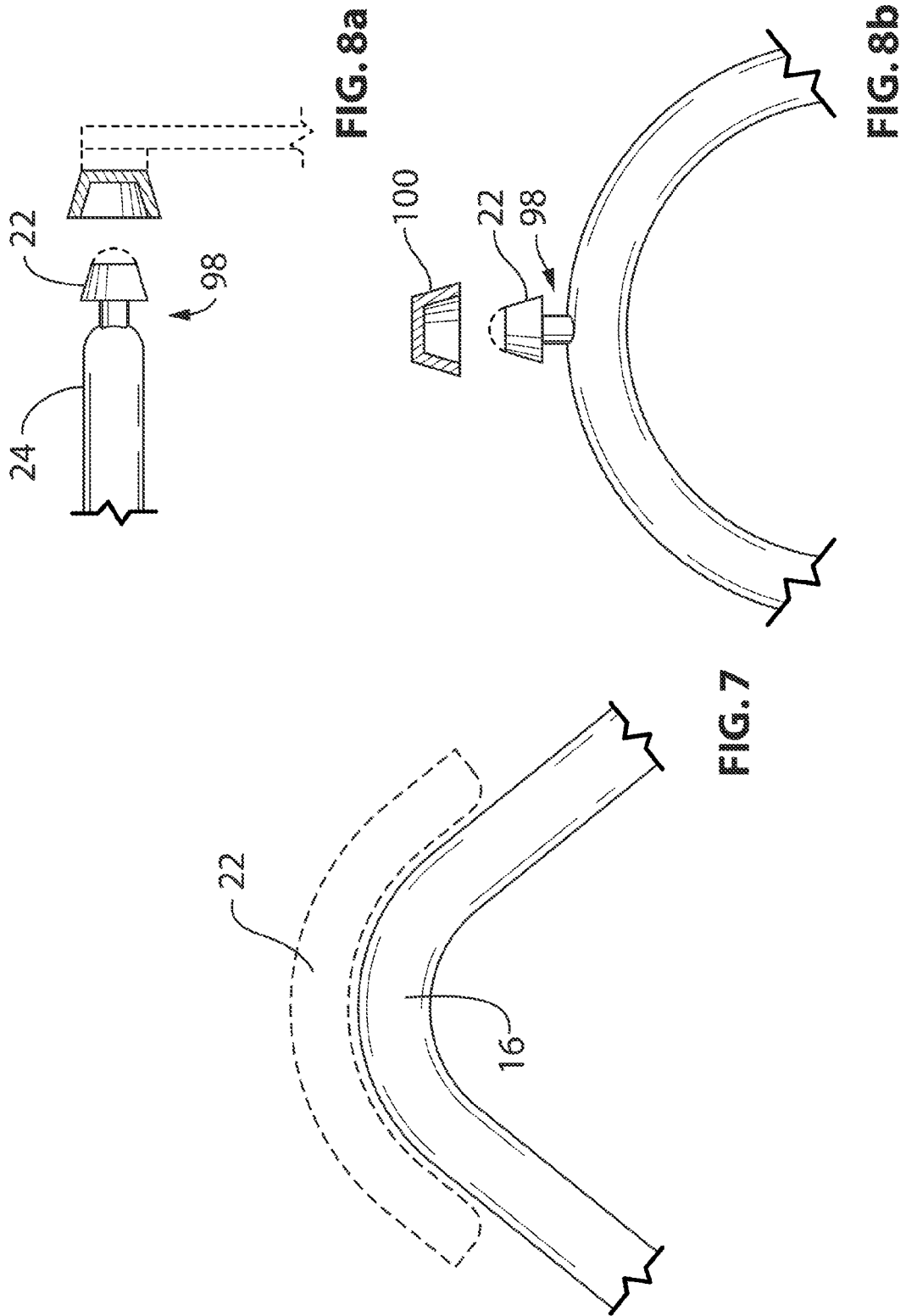

RECEIVER DEVICE FOR ENGAGING A LANDING GEAR ADAPTER WITH A TUG

CROSS-REFERENCE TO RELATED APPLICATIONS

This application claims the benefit of U.S. Provisional Application No. 61/392,541 filed on Oct. 13, 2010, which is hereby incorporated by reference in its entirety.

TECHNICAL FIELD

The present disclosure relates to landing gear adapters and their interconnection with aircraft transfer tugs.

BACKGROUND

Aircraft often are required to be moved in and out of hangars and repositioned on airport aprons. Typically these aircraft are towed using a tug and tow bar, or a "towbarless" tug equipped with a winch and cradle for capturing and towing via nose landing gear. Fixed landing gear aircraft equipped with castering nose landing gear and sloped strut with or without aerodynamic wheel fairing have posed a unique towing challenge for tug operators.

Conventional tugs, equipped with a pintle hook, a towbar and aircraft specific towing head that plugs into the nose landing gear towing lugs, tend to break turning linkages and towbars are known to scratch wheel fairings as the towbar is being installed or removed. Additionally, pushing back an aircraft, with a short wheel base, castering nose landing gear, requires tedious reverse inputs by a skilled operator, who would often take several attempts to effectively position these aircraft.

"Towbarless" tugs are typically equipped with a cradle to raise the nose landing gear, a winch with strut strap to capture the aircraft onto the cradle and a holdback bar to prevent the nose wheel fairing from contacting the rear gate of the cradle. The holdback bar is known to damage sloped strut, oleo, or strut fairings as the bar needs to keep positive contact with the fairing that's not designed to be load bearing. Oleo fairings get damaged by the hold back bar when the tug operator hits a bump. As the oleo depresses, the fairing impacts the holdback bar. The problem is more likely if the oleo is under inflated. Additionally, wheel guidance tools placed on the cradle are known to damage the lower part of the wheel fairing.

"Towbarless" tug operators have used a combination of the conventional and "towbarless" methods by using an adapter that inputs into towing lugs and is winched via chain onto the cradle and positively secured by a front pintle hook. This method avoids the tedious reverse inputs of a conventional tug and tow bar, but nonetheless requires the time consuming task of securing the pintle hook in place on an adapter post and raising/lowering of the pintle jaw to positively secure the adapter in place. Another problem with the pintle hook and adapter method is the overall length of the pintle hook from the back of the cradle means certain models of aircraft have tires near the edge of the cradle. More importantly, some aircraft manufacturers tire/wheel fairing/towing lug configurations cannot be accommodated as a result. Plus the female steel adapter towing insert still tends to scratch nose wheel fairings.

The 'pintle-hook towbarless adapter' and 'holdback bar' methods open the nose landing gear capture process to operators using a dangerous practice called 'scooping'. This involves driving the cradle under the nose wheel of an aircraft with 'chocked' main landing gear. The operation saves the time required to winch the aircraft on to the cradle, but there is a great risk of impacting the aircraft wheel fairing with the tug cradle.

Additionally there are various powered tow bars and combinations that use the conventional towing lugs and hold down or hold back mechanisms to tow these aircraft. Examples of these are a wheel guide and hook/loop fastener strap to hold the nose wheel down and prevent it from "jumping" out of the wheel guide. Or a tow bar type mechanism to winch the aircraft onto the cradle with wheel guide. These methods are time consuming to use and costly, since the solutions are generally aircraft specific, with some perhaps working on two aircraft types.

SUMMARY

The following presents a simplified summary of the general inventive concept herein to provide a basic understanding of some aspects of the invention. This summary is not an extensive overview of the invention. It is not intended to restrict key or critical elements of the invention or to delineate the scope of the invention.

In an exemplary embodiment, there is provided a receiver device for engaging a landing gear adapter unit with a tug. The adapter includes a tow bar with a neck portion between a pair of spaced arm portions. The receiver device comprises a central boundary surface forming a boundary of a travel path for the neck portion and configured to be complementary with and to engage a corresponding abutment surface on the neck portion. A pair of lateral boundary surfaces is provided, each extending along the central boundary surface. A mounting portion is provided for mounting the receiver device on the tug in an operative configuration relative to a landing gear-receiving base thereon. At least one releasable locking member is positioned along the travel path to interrupt travel of the neck portion. The locking member is movable between a first unlocked position located distal to the central boundary surface and a second locked position proximal to the central boundary surface. Further, in the second locking position, the locking member is configured to lock the mounting portion in the operative configuration.

Some exemplary embodiments further comprise a central panel defining the central boundary surface and spaced upper and lower flanges, each defining one of the lateral boundary surfaces.

In some exemplary embodiments, the locking member is biased toward the first unlocked position.

In some exemplary embodiments, the mounting portion includes a first passage to receive a support post extending upwardly relative to the base, while the locking member includes a locking pin slidably arranged to engage at least one second passage in the support post.

In some exemplary embodiments, the central boundary surface is circular in cross section, though it may also be triangular, linear, rectangular and the like.

Some exemplary embodiments further comprise at least one exterior surface, and at least one pair of mounting formations thereon for receiving and storing a corresponding pair of coupling elements.

In some exemplary embodiments, the neck portion includes a projection extending outwardly therefrom, the abutment surface being formed on the projection.

In some exemplary embodiments, the lower flange is arranged for mounting adjacent the base in the operative configuration. In this case, the base on the tug includes at least one abutment formation and leading boundary surface adjacent the tug, the locking member configured to engage the abutment formation, when the channel portion is in the operative position.

In some exemplary embodiments, the abutment formation includes a third passage formed in the base, while the lower flange has a fourth passage complementary with the third passage when the channel portion is in the operative position. In this case, the locking member is operable to pass through the third and fourth passages to brace the enclosure against the first pan boundary surface.

In some exemplary embodiments, the locking member includes at least one cam element.

In another exemplary embodiment, there is provided a latching assembly for latching a front landing gear unit to a tug, comprising a tow bar adapter with a pair of arm portions for engaging opposite sides of the front landing gear unit and a neck portion joined therebetween. A receiver is provided for engaging the tow bar adapter with a tug. The receiver includes a channel portion with a central boundary surface. The channel portion is open to receive the neck portion, while the central boundary surface is configured to be complementary with the neck portion. The central boundary surface forms a boundary on a travel path for the neck portion. The channel portion includes a pair of lateral boundary surfaces, each extending along the central boundary surface for locating the neck region relative to the central boundary surface.

Also provided in this exemplary embodiment is a mounting portion for mounting the receiver device on the tug in an operative configuration relative to a landing gear-receiving base thereon. At least one releasable locking member is positioned along the travel path to interrupt travel of the neck portion. The locking member is movable between a first (unlocked) position and a second (locked) position as the neck portion approaches the central boundary surface and proximal to the central boundary surface in which the locking member locks the mounting portion in its operative configuration.

In another exemplary embodiment, there is provided a receiver device for engaging a landing gear adapter unit with a tug. The adapter includes a tow bar with a neck portion between a pair of spaced arm portions. The receiver device comprises a central boundary surface forming a boundary of a travel path for the neck portion and which is configured to be complementary with and to engage a corresponding abutment surface on the neck portion. A pair of lateral boundary surfaces is provided which extend along the central boundary surface. A mounting portion is provided for mounting the receiver device on the tug in an operative configuration relative to a landing gear-receiving base thereon. At least one exterior surface is provided, and at least one pair of anchor formations is provided on the exterior surface for receiving and storing a corresponding pair of adapter coupling elements.

In some exemplary embodiments, the exterior surface is formed on a rear panel, with each anchor formation including a post anchored to the rear panel. Each post includes a distal end region dimensioned to be complementary to an interior passage in the corresponding coupling element.

Some exemplary embodiments further comprise a split ring positioned in a groove in the distal end region. The split ring is configured to deliver a retaining force to the coupling element to aid in removably securing the coupling element to the post. Other devices may also be used to deliver the retaining force, including spring loaded ball detents, latches, resilient sleeves and the like.

In another exemplary embodiment, there is provided landing gear adapter assembly for installing an aircraft on a tug, comprising a landing gear adapter unit. The landing gear adaptor unit includes a tow bar with a neck portion between a pair of spaced arm portions. Each arm portion supports one of a pair of adaptor coupling elements to couple the arm portion with a corresponding side of a front nose landing gear of the aircraft. A first of the arm portions includes a remote end region with a first mounting member thereon. The first mounting member is configured to extend into a complementary mounting passage in a first of the coupling elements.

A second of the arm portions includes a remote end region with a second mounting member thereon. The second mounting member is configured commonly with the first mounting member to extend into a complementary mounting passage in a second of the coupling elements. A receiver unit is provided for mounting on the tug and configured for receiving the neck portion.

A support panel is also provided to support at least one pair of third mounting members, which are configured commonly with the first and second mounting members to extend into a complementary mounting passage in the first and second coupling elements. Each of the first, second and pair of third mounting members retain one of a plurality of corresponding releasable locking elements for receiving and releasably storing the first and second adapter coupling elements thereon. Each of the releasable locking elements are configured to have a first disengaged configuration on the corresponding mounting member prior to engagement with the corresponding coupling element, an intermediate engaged configuration on the corresponding mounting member during installation of the coupling element thereon and a third fully engaged and releasably locked configuration on the corresponding mounting member with the corresponding coupling element.

In some embodiments, the releasable locking elements are the same and are split rings or spring loaded ball detents. In some embodiments, the arm portions are circular or rectangular in cross section. In some embodiments, the support panel is positioned on the receiver unit, though it may be placed elsewhere in the vicinity of the receiver unit, such as for example mounted on the tug.

In another exemplary embodiment, there is provided a method of installing an aircraft on a tug for transport, comprising, providing a tow bar adapter with a neck portion and a pair of arm portions for mounting on a front landing gear unit of the aircraft; installing the tow bar adapter by engaging each arm portion with a corresponding side portion of the front gear landing unit; providing the tug with a landing gear-receiving base; providing a receiver for engaging the tow bar adapter with the tug, the receiver including a channel portion with a central boundary surface, the channel portion being open to receive the central adapter portion, the central boundary surface being configured to be complementary with the neck portion, a pair of lateral boundary surfaces, each extending along the central boundary surface for locating the neck region relative to the central boundary surface, and a mounting portion for mounting the receiver device on the tug in an operative configuration relative to the landing gear-receiving base, at least one releasable locking member positioned along the travel path to interrupt travel of the central adapter portion, the locking member being movable between a first unlocked position located distal to the central boundary surface and a second locked position proximal to the central boundary surface in which the locking member locks the mounting portion in the operative configuration; placing the receiver in an operative configuration above the base; and directing the neck portion along the lateral travel path toward the central boundary surface to engage and transfer the locking member from the first unlocked position toward the second locked position.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2 is a fragmentary view of the receiver device of FIG. 1 in an operative position, while FIG. 2a is a fragmentary part-cross sectional view taken on line 2a-2a in FIG. 2;

FIG. 3 is a fragmentary view of the receiver device of FIG. 1 in the position of FIG. 2a, while

FIG. 7 is a plan view of another receiver device;

FIG. 8a is a side view of still another receiver device; and

FIG. 8b is a plan view of the receiver device shown in FIG. 8a.

DETAILED DESCRIPTION OF EXEMPLARY EMBODIMENT(S)

Figure 1:
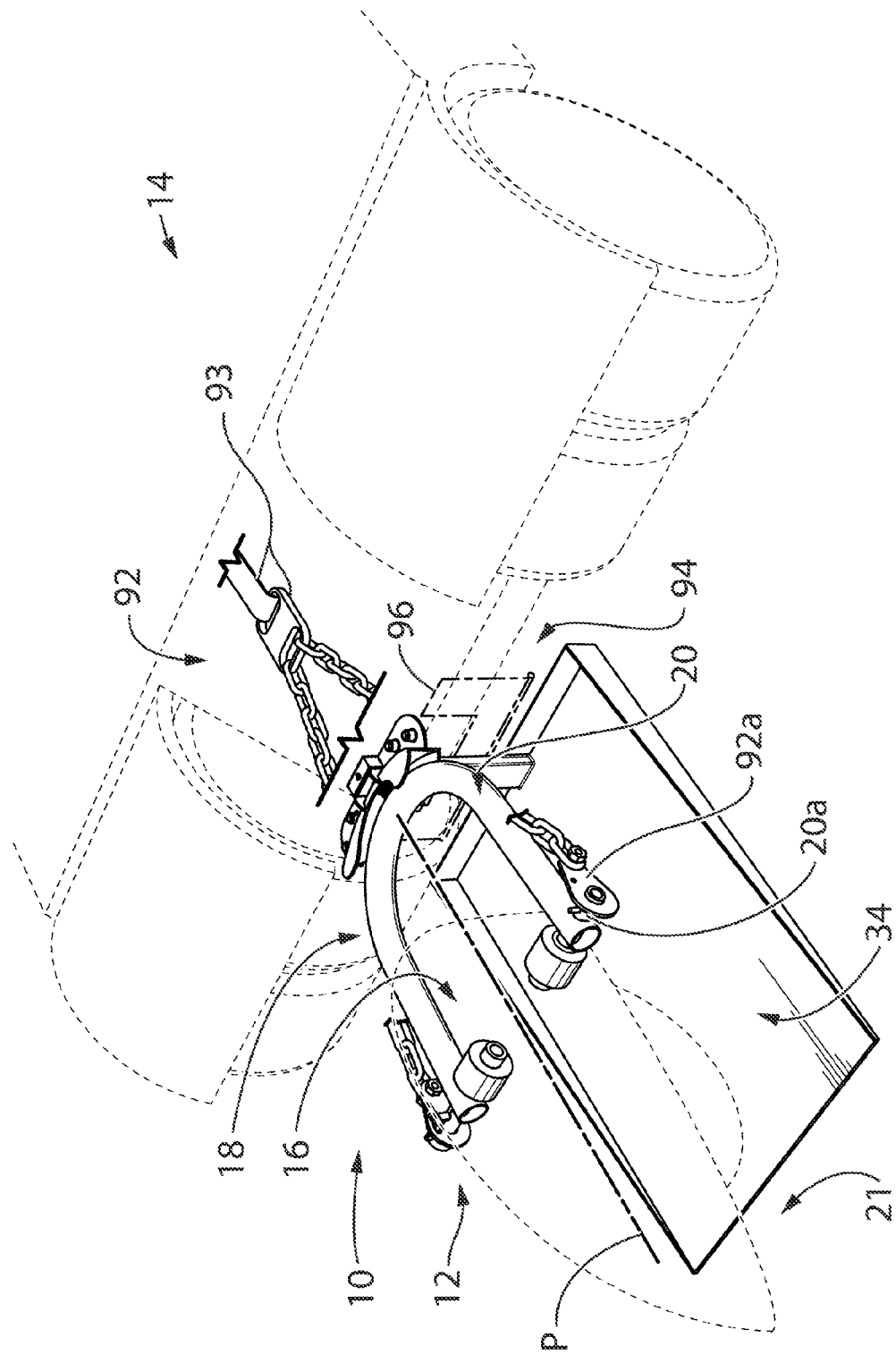
FIG. 1 is a fragmentary perspective view of a tug with a receiver device for engaging a landing gear adapter.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or electrical connections or couplings. Furthermore, and as described in subsequent paragraphs, the specific mechanical and/or electrical, other configurations illustrated in the drawings are intended to exemplify embodiments of the invention. However, other alternative mechanical and/or electrical or other configurations are possible which are considered to be within the teachings of the instant disclosure.

Referring to the figures, there is provided a receiver device 10 for engaging a landing gear adapter unit 12 with a tug 14. The adapter unit 12 includes a tow bar 16 with a neck portion 18 between a pair of spaced arm portions 20, which, in use, are installed on opposite sides of an aircraft landing gear unit shown in phantom at 21.

Figure 3A:
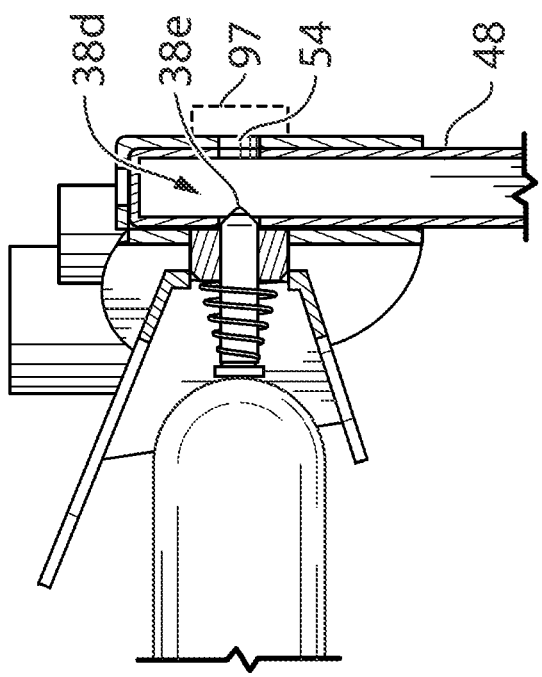
FIG. 3a is cross sectional view of the receiver device and a support post.
Figure 3:
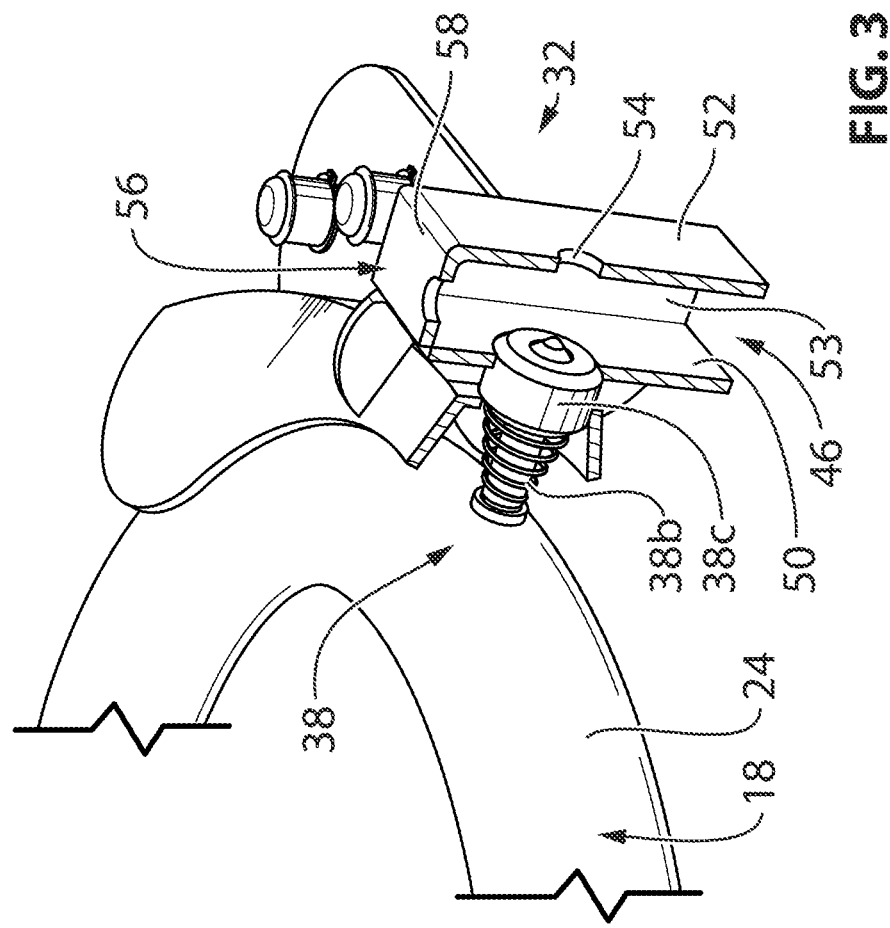
Figure 4:
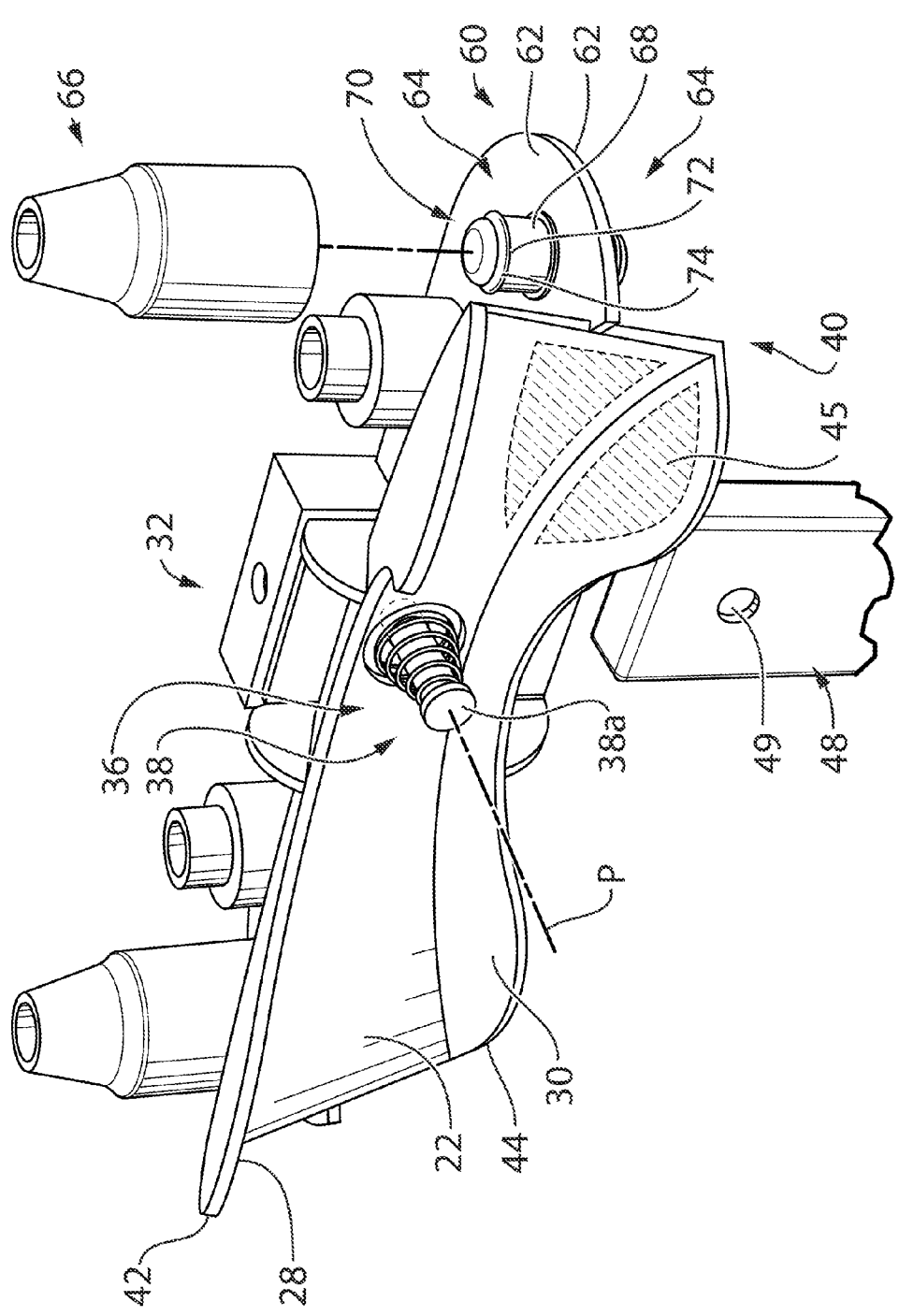
FIG. 4 is another fragmentary view of the receiver device of FIG. 1.

Referring to FIGS. 3 and 4, the receiver device 10 comprises a central boundary surface 22 forming a boundary of a travel path P for the neck portion 18 and configured to be complementary with and to engage a corresponding abutment surface 24 on the neck portion 18.

Figure 5A:
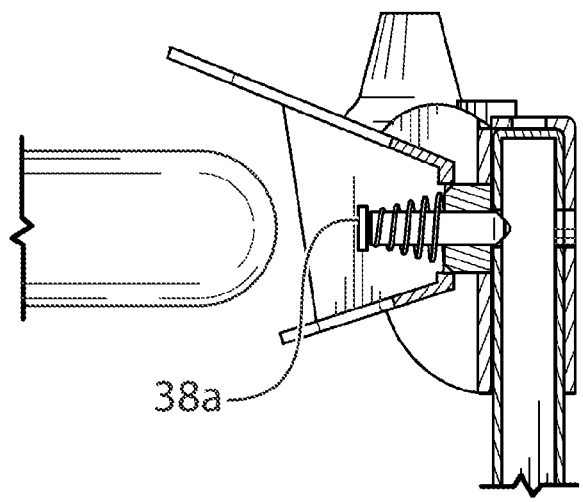
FIGS. 5a, 5b and 5c are sequential schematic side views of the receiver device in operation.
Figure 5B:
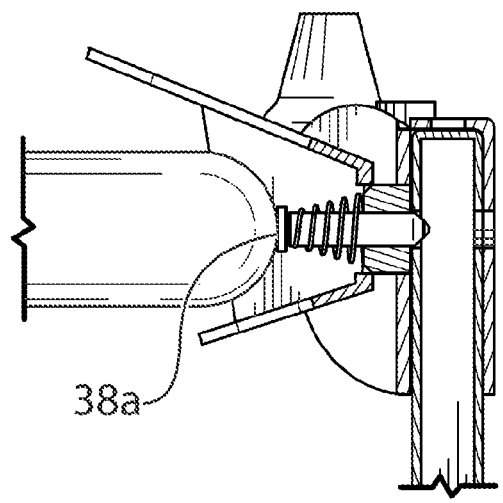
Figure 5C:
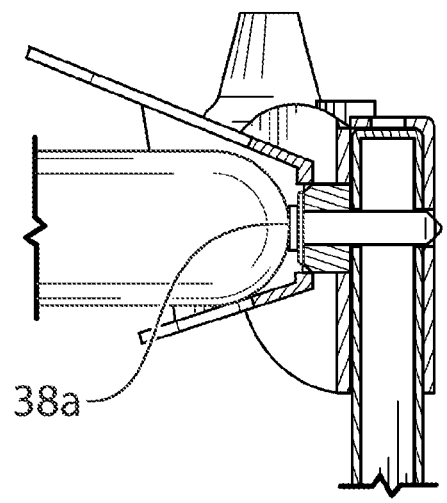

A pair of lateral boundary surfaces is provided at 28 and 30, each of which extends along the central boundary surface 22. A mounting portion is provided at 32 for mounting the receiver device 10 on the tug 14 in an operative configuration relative to a landing gear-receiving base or cradle thereon, as shown at 34 in FIG. 1. As best seen in FIG. 4, at least one releasable locking member 36, including in this case a spring loaded pin 38, is positioned along the travel path P to interrupt travel of the neck portion 24. The locking member 36 is movable between a first unlocked position, shown in FIGS. 4 and 5a, in which the head portion 38a of the pin 38 is located distal to the central boundary surface 22 and a second locked position, as shown in FIG. 5c, in which the head portion 38a is proximal to the central boundary surface 22. Further, in the second locked position, the locking member 36 is configured to lock the mounting portion 32 in the operative configuration, as will be described. It will be seen that the head portion 38a is effectively counter sunk within a passage 22a formed in the boundary wall portion in this example, thus enabling the head portion 38a to lie flush with the central boundary surface 22. If desired, the countersinking may be provided in other configurations, such as by providing a countersinking recess in the locking pin support 38c.

The central boundary surface 22 is provided by a central panel 40 with spaced upper and lower flanges 42, 44, each defining, respectively, one of the lateral boundary surfaces 28, 30. The central panel 40 and/or upper and lower flanges 42, 44 may be provided with a protective layer shown at 45 formed of a polymer material or the like on the central and lateral boundary surfaces 22, 28 and 30.

Referring to FIGS. 2, 3 and 4, the mounting portion 32 includes a first passage 46 to receive a support post 48 extending upwardly relative to the base 34, while the locking pin 38 is slidably arranged to engage one of a plurality of second passages 49 (FIG. 4) in the support post 48. In this case, the locking pin 38 is biased toward the first unlocked position by way of a spring 38b and held within locking pin support 38c. While the support post is shown to be extending directly from the base 34, the support post may instead extend from the tug chassis and have different configurations from the linear configuration shown in FIG. 1. For instance, the post may be right angled to provide an upright portion and an inclined portion, the latter being coupled to the tug. If desired, the post may be a portion of another portion of the tug other than the base, such as a structure extending along the tug and within reach of the operator.

The mounting potion 32 includes a first pair of side panels 50, 52 on opposite sides of the first passage 46. The locking pin 38 is mounted on the side panel 50 and aligned with an opening 54 in the side panel 52. The locking pin 38 includes a tail portion 38d which is configured to emerge through the opening 54 in the locked position. In this example, the tail portion 38d includes a beveled end region 38e. The beveled end region 38e includes a surface with indicia, coloring or markings recognizable to a user when the beveled end region 38e is either in or extending beyond the opening, to provide a visual or tactile queue that the locking pin 38 is in the locked position. The mounting portion 32, in this example, includes a housing 56 formed by the first pair of side panels 50, 52, a second pair of side panels, one shown at 53, and a barrier in the form of an end wall portion 58 to close one end of the first passage, or otherwise to prevent passage of the support post 38 therethrough. However, if desired, the end may also be open to allow the mounting portion to be adjusted along the height of the support post as desired to adjust the position of the receiver device relative to the landing gear receiving base 34 and may provide more than one second passage as desired.

Further, in some exemplary embodiments, the pin may be biased toward the second position and/or have positive locating formations to hold the pin in the locked position.

A rear panel 60 extends outwardly from the central panel 40, and provides pair of upper and lower exterior surface 62 with a number of anchor formations 64 thereon for receiving and storing a corresponding number of coupling elements 66. The coupling elements 66 are provided in pairs and are positionable on locating pins 20a on the arm portions 20 (FIG. 2a), to function as the interfaces with the landing gear unit of the aircraft in question. Thus, the anchor formations 64 offer a convenient location to store the coupling elements 66 for the different aircraft being towed.

In this example, each anchor formation 64 includes a post 68 anchored to the rear panel 60 with a distal end region 70 dimensioned to be complementary with an interior passage 66a with an inner groove 66b in the coupling element 66. A split ring 72 is positioned in a groove 74 in the distal end region 70 to form a snap coupling. Thus, the post extends into the interior passage 66a with the split ring 72 configured to compress and slide along the inner boundary of the inner passage until it comes to rest in the inner groove 66b, by which the spilt ring 72 provides a degree of a retaining force on the coupling element 66 to removably secure the coupling element on the post 68.

Similarly, the locating pins 20a are provided with the same split ring 72. The interior passage 66a is formed in a metallic insert 67 molded into the coupling element (formed of a polymer material in this case), provided with the groove 66b to receive the split ring 72, which similarly comes to rest in the inner groove 66b to removably secure the coupling element on the locating pin 20a.

Thus, each of the releasable locking elements are configured to have a first disengaged configuration on the corresponding mounting member prior to engagement with the corresponding coupling element, an intermediate engaged configuration on the corresponding mounting member during installation of the coupling element thereon and a third fully engaged and releasably locked configuration on the corresponding mounting member with the corresponding coupling element. While the releasable locking elements are the same and deploy, in this case, split rings, they may be also involve other configurations such as spring loaded ball detents, latches, buttons, resilient sleeves and the like, in which they are retained on the locating pins and on the posts 68 throughout the first, second and third configurations.

In some exemplary embodiments, the arm portions are circular or rectangular in cross section.

In some exemplary embodiments, the support panel is positioned on the receiver unit, though it may be placed elsewhere in the vicinity of the receiver unit, such as for example mounted on the tug.

The receiver device 10 may be oriented in a number of different operative configurations relative to the base 34. In the example of FIG. 1, the receiver device 10 is positioned on the post 48 relative to the base.

Figure 6A:
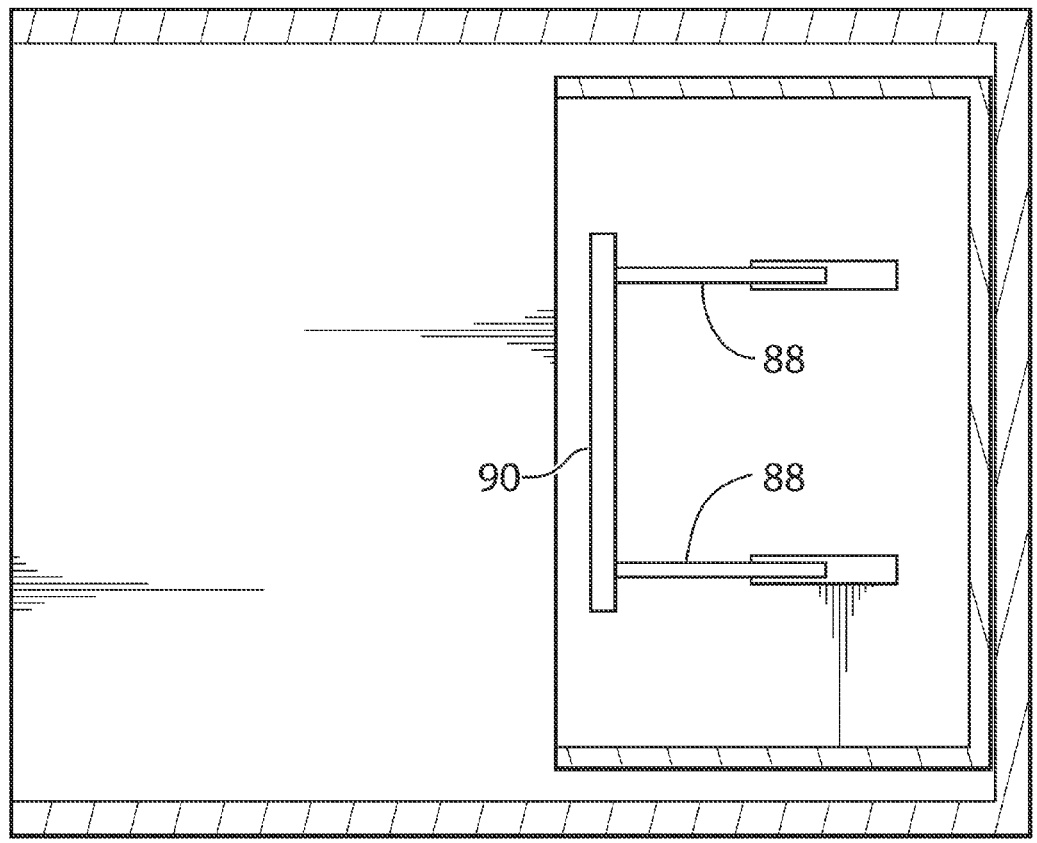
FIGS. 6a and 6b are plan and sectional views of another receiver device.
Figure 6B:
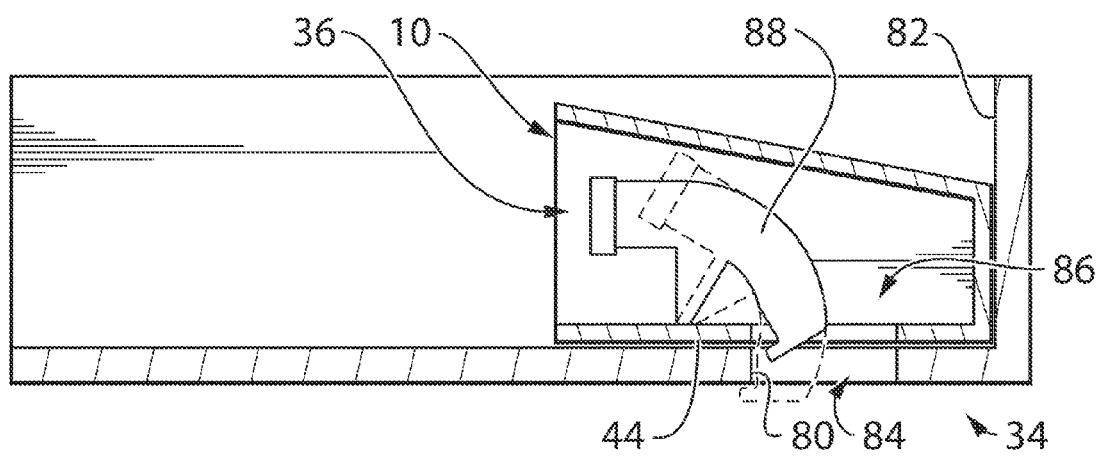

Alternatively, as shown in FIGS. 6a, 6b, the lower flange 44 may be arranged for mounting adjacent the base 34 in the operative configuration. In this case, the base 34 on the tug includes at least one abutment formation 80 and a leading boundary surface 82 adjacent the tug. In this case, the locking member 36 is configured to engage the abutment formation 80, when the receiver device 10 is in the operative position. Thus, provision may be made for locking the receiver device relative to the leading boundary surface 82.

In the example shown in FIGS. 6a, 6b, the abutment formation may include a third passage 84 formed in the base, while the lower flange 44 may include a fourth passage 86 which is complementary with the third passage 84 when the channel portion is in the operative position. In this case, the locking member 36 includes one or more cam elements 88 which are operable to pass through the aligned third and fourth passages 84, 86 to brace the receiver device 10 against the leading boundary surface 82. In this configuration, a pair of cam elements 88 is provided with an actuating portion 90 extending between them allowing for simultaneous activation upon engagement with the landing gear unit. Of course, other mechanisms may be employed to provide a releasable anchoring of the receiver device 10 on, adjacent or above the base 34 as the case requires.

Referring to FIG. 1, the tug is provided with a motorized winch with a pull chain provided at 92 which is coupled at one end to a hook 93 and at two other ends to each of the locating pins 20a by way of lugs 92a, to the landing gear adapter unit 12, once installed on the landing gear unit 21. Further, the winch is provided with a cut-off switch assembly shown in phantom at 94 which includes a paddle, shown in phantom at 96, which is positioned, in this example, above the base 34 to interrupt the travel of the neck portion 18 to switch off the winch when the neck portion has landed in position adjacent the central boundary surface. If desired, other mechanisms may be used to provide cut off switch capability in place of or in addition to the cut-off switch assembly 94. For instance, a pressure switch unit, as shown in phantom at 97, may be deployed to be actuated by the beveled end region 38e, as it emerges from opening 54.

The receiver device 10 may be employed in the following manner to position or install an aircraft on a tug for towing. First, the tow bar adapter 16 is provided with a neck portion 18 and a pair of arm portions 20 for mounting on a front landing gear unit 21 of the aircraft. The tow bar 16 is installed by engaging each arm portion 20 with a corresponding side of the front gear landing unit 21. This is done by selecting the pair of coupling elements 66 that match the aircraft nose landing gear towing lugs according to the model of aircraft to be towed. The coupling elements are thus removed from their respective anchor posts 68 and inserted on the locating pins 20a located on the arm portions 20.

The tug 14 is then provided with a suitable landing gear-receiving base 34 while the receiver device 10 is installed in its operative configuration by placement on the post 68. In this configuration, the receiver device 10 is retained by the force of gravity and is not yet locked in position.

Once installed on the landing gear unit 21, the tow bar 16 is coupled with the chain 92 and the winch is then activated to direct the neck portion 18 along the lateral travel path P toward the central boundary surface 22 to engage and transfer the locking member 36 from the first unlocked position toward the second locked position, thereby drawing the landing gear unit 21 onto the base. In so doing, the neck portion 18 engages the paddle 96, so that as the neck portion 18 reaches its position adjacent to or abutting the central boundary panel 22, the cut off mechanism becomes fully engaged and switches off the winch. Meanwhile, the neck portion 18 engages the locking pin 38 and transfers it to the second locked position, thereby causing the locking pin to progress into and through the second passage 48 until the beveled end region on the tail portion 38d emerges beyond the opening 54. This locks the mounting portion on the support post, while allowing the user to verify same by the appearance of the beveled end region (aided by the treatment thereon) at the opening 54.

While the central boundary surface 22 is circular in cross section, it may be of other configurations, such as triangular, to match a triangular tow bar 16 as shown in FIG. 7.

If desired, as shown in FIG. 8, the neck portion may include a projection 98 extending outwardly therefrom, with the abutment surface being formed on the projection. In this case, the projection is shown to have a pyramid-like or circular outer end region which is complementary with a receiver unit shown at 100.

Thus, in one example, the receiver may be employed to replace the pintle hitch for winch/cradle towbarless tugs and may be configured to draw the aircraft tire further onto the base or cradle. The spring, in this case, may be a low profile conical spring that's depressed by the adapter being winched to lock the receiver device in its operative configuration, thereby avoiding the need to positively secure it onto the adapter post, thereby reducing capture time. The envelope provided by the central panel and upper and lower flanges allows the winch tension to positively secure the aircraft into place without the need for a jaw to open and close. However the design of the receiver allows slight lateral movement to prevent turning linkage damage if aircraft manufacturers turning limits are exceeded.

In one example, the combination of winch tension and the upper flange of the receiver reduces, if not eliminates, the risk of the nose landing gear of tail heavy aircraft from lifting off the cradle. The receiver, having drawn aircraft father onto the cradle, allows for the adapter to work on various aircraft through the use of interchangeable pin caps using inexpensive wire snap rings. Thus, the ability to winch the adapter into a receiver envelope reduces, if not eliminates, the reduced capture time incentive of scooping an aircraft, since the adapter needs to be winched into the receiver in order to secure it.

Thus, in one example, the receiver device provides an envelope for receiving the adapter, a locking pin and spring mechanism for securing the envelope onto the adapter post. The envelope is configured to work with a winch cut-off mechanism, and Semi-closed wire snap rings that hold pin caps that are not in use, and having the retainer flange reinforce the envelope.

If desired, the receiver flange may be placed at the cradle level. The receiver may be a different shape, such as pyramid shaped, with a matching flange on the adapter. Alternatively, the receiver may be rectangular or box shaped, with the matching flange on the adapter being formed of bent square tubing or the like.

In one example, the receiver device may be used as follows. First, the tug may be checked to see if it is equipped with a Cantering NLG Adapter, Receiver, and pin caps for the aircraft make and model being towed. Pin caps not installed on the Adapter should be installed on the upper or lower side of the receiver flange. When possible, the capturing step should occur on level ground with the nose wheel straight. The tug may then be positioned parallel and centered to the aircraft's nose wheel, with the forward most portion of the cradle approximately 3 ft from the front of the nose wheel pant. The operator then selects and installs both of the make and model specific towing lug pin caps on the adapter.

The adaptor is then installed on the aircraft nose wheel towing lugs, while taking note of the "THIS SIDE UP" or "THIS SIDE DOWN" marking and be careful not to contact the wheel pant with any part of the adapter. The adapter axial pin is then closed and the t-handle locking pin fully extended into the adapter pin hole. If necessary, the adapter may be used to turn the aircraft nose wheel straight in line with the tug. The receiver is installed onto the adapter post, so that the locking pin is aligned with a third passage. The strut trap portion is removed from the winch hook The hook is connected with the adapter chain. The adapter is winched to contact the receiver upper or lower flange and to depress the spring mounted pin through the receiver thereby securing both adapter and receiver onto the adapter post. It may be necessary to guide the adapter into the receiver envelope. On some towbarless tugs the adapter will contact and depress the winch cut-off. It may be necessary to override the winch cut-off to correctly tension the strap to secure the adapter into the receiver envelope and Receiver onto the adapter post. The tug cradle is raised and it is advisable to check that the receiver pin is pushed all the way through the adapter post and back of the receiver by looking for the treated tip. The strap is then tensioned so that the tip does appear through the back of the receiver.

While towing the aircraft it is advisable to check the nose wheel immediately before entering a turn, at regular intervals while turning and immediately after completing the turn to ensure the wheel fairing remains clear of the tug's structure.

While a device or assembly and an accompanying method have been described for what are presently considered the exemplary embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A receiver device mountable on a tug and engaged with a landing gear adapter unit, the landing gear adapter unit including a tow bar with a central portion connecting a pair of spaced-apart arm portions, the receiver device comprising:
    a central boundary surface portion defining a boundary of a travel path for the central portion of the tow bar;
    a mounting portion for mounting the receiver device on the tug in an operative configuration with a landing gear-receiving base operably attached to the mounting portion; and
    at least one releasable locking portion movable, by the central portion of the tow bar travelling along the travel path, between an unlocked position where the central portion of the tow bar is distal to the central boundary surface portion and a locked position where the central portion of the tow bar is proximal to the central boundary surface portion and the mounting portion is locked in the operative configuration.

2. A receiver device according to claim 1, further comprising a central panel defining the central boundary surface portion, and spaced-apart upper and lower flanges, each flange defining a lateral boundary surface portion which defines an additional boundary of the travel path for the central portion of the tow bar.

3. A receiver device according to claim 2, wherein the at least one releasable locking portion includes a locking member with a head portion and a spring to bias the head portion toward the unlocked position.

4. A receiver device according to claim 3, wherein the mounting portion includes a first passage to receive a support post extending upwardly from the landing gear-receiving base, the at least one releasable locking portion including a locking pin slidably arranged to engage at least one second passage in the support post.

5. A receiver device according to claim 4, further comprising at least one exterior surface, and at least one pair of anchor formations on the at least one exterior surface for receiving and storing a corresponding pair of coupling elements.

6. A receiver device according to claim 5, wherein the at least one exterior surface is formed on a rear panel of the mounting portion, each of the anchor formations including a post anchored to the rear panel to removably secure a corresponding coupling element thereon, and each post including a distal end region dimensioned to be complementary to an interior passage in the corresponding coupling element.

7. A receiver device according to claim 6, further comprising a split ring positioned in a groove in the distal end region of each post, the split ring configured to deliver a retaining force to the corresponding coupling element to aid in removably securing the corresponding coupling element to the post.

8. A receiver device according to claim 4, wherein the mounting portion includes a housing formed by the pair of opposed first panels and a top cap portion which closes one end of the first passage.

9. A receiver device according to claim 4, wherein the central boundary surface portion defines an arcuate shape.

10. A receiver device according to claim 4, wherein the mounting portion includes a pair of opposed first panels on opposite sides of the first passage, the locking pin being mounted relative to one of the first panels and aligned with an opening in the other of the first panels, and the locking pin including an end region which is configured to extend through the opening in the locked position.

11. A receiver device according to claim 10, wherein the end region of the locking pin is beveled.

12. A receiver device according to claim 10, wherein the end region of the locking pin includes a surface with indicia, coloring or markings recognizable to a user when the end region is either in or extending beyond the opening, to indicate that the locking pin is in the locked position.

13. A receiver device according to claim 1, wherein the at least one releasable locking portion includes at least one cam element.

14. A latching assembly for latching a front landing gear unit to a tug, the latching assembly comprising:
  a tow bar adapter with a neck portion joining a pair of spaced-apart arm portions for engaging opposite sides of the front landing gear unit;
  a receiver for engaging the tow bar adapter with the tug, the receiver including a channel portion with a central boundary surface, the channel portion being open to receive the neck portion of the tow bar adapter and defining a boundary of a travel path for the neck portion, the channel portion of the receiver including a pair of lateral boundary surfaces extending along the central boundary surface for locating the neck portion of the tow bar adapter relative to the central boundary surface of the channel portion;
  a mounting portion for mounting the receiver on the tug in an operative configuration with a landing gear-receiving base operably attached to the mounting portion; and
  at least one releasable locking member positioned along the travel path to interrupt travel of the neck portion, the at least one releasable locking member being movable between an unlocked position and a locked position as the neck portion of the tow bar adapter approaches the central boundary surface of the channel portion to lock the mounting portion in the operative configuration.

15. A receiver device mountable on a tug and engaged with a landing gear adapter unit, the landing gear adapter unit including a tow bar with a neck portion connecting a pair of spaced-apart arm portions, the receiver device comprising:
  a central boundary surface defining a boundary of a travel path for the neck portion and configured to be complementary with and to engage a corresponding abutment surface on the neck portion;
  a pair of lateral boundary surfaces extending along the central boundary surface, each lateral boundary surface defining an additional boundary of the travel path for the neck portion of the tow bar;
  a mounting portion for mounting the receiver device on the tug in an operative configuration with a landing gear-receiving base operably attached to the mounting portion;
  at least one exterior surface; and
  at least one pair of anchor formations on the at least one exterior surface for receiving and storing a corresponding pair of adapter coupling elements.

16. A receiver device according to claim 15, wherein the at least one exterior surface is formed on a rear panel of the mounting portion, each anchor formation including a post anchored to the rear panel, each post including a distal end region dimensioned to be complementary to an interior passage in the corresponding adapter coupling element.

17. A receiver device according to claim 16, further comprising a split ring positioned in a groove in the distal end region of each post, the split ring configured to deliver a retaining force to the corresponding adapter coupling element to aid in removably securing the corresponding adapter coupling element to the post.

* * * * *